Jan. 9, 1923.
F. W. KROGH.
CENTRIFUGAL CONVEYER.
FILED JUNE 19, 1918.
1,441,589.
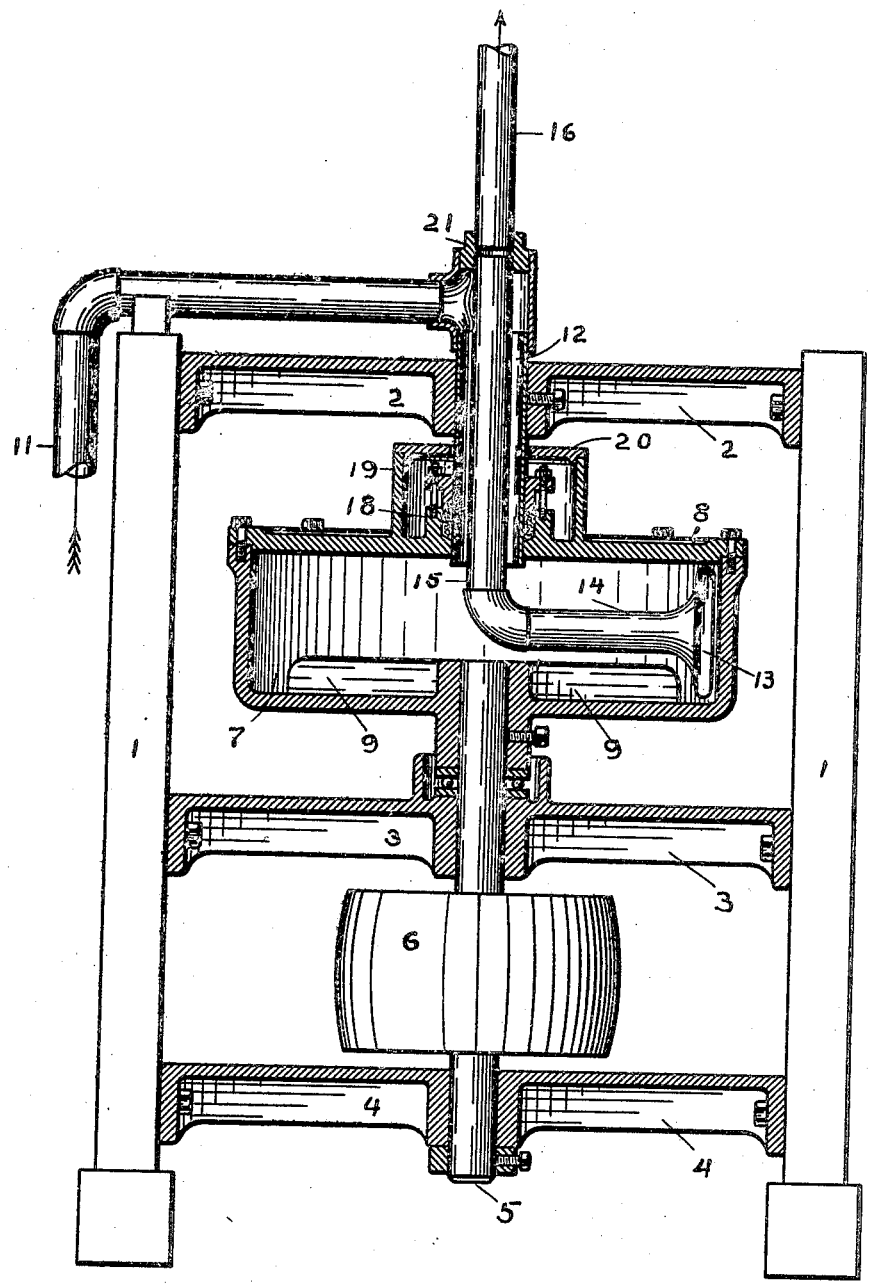
INVENTOR
F. W. Krogh.
PER A. S. Paré
ATTORNEY.

Patented Jan. 9, 1923.

1,441,589

UNITED STATES PATENT OFFICE.

FERDINAND W. KROGH, OF SAN FRANCISCO, CALIFORNIA.

CENTRIFUGAL CONVEYER.

Application filed June 19, 1918. Serial No. 240,874.

*To all whom it may concern:*

Be it known that I, FERDINAND W. KROGH, of San Francisco, State of California, have invented certain new and useful Improvements in Centrifugal Conveyers, whereof the following is a specification.

This invention relates to centrifugal conveyers, and is intended more particularly for mining purposes, but is capable of other uses.

In its general features the invention comprises a conduit through which the tailings, or other material to be conveyed, is conducted to a rotating vessel, where a movement of rotation is imparted to it, which forces it into the mouth of a conductor and through the same to a point of delivery.

In the accompanying sheet of drawing I have illustrated the invention as used for mining purposes.

The figure is a sectional elevation of the entire apparatus.

In the drawings:—a frame is represented by 1. This frame supports three cross brackets 2, 3 and 4, which in turn, support bearings for a shaft 5. The shaft may be driven by a pulley 6. Attached to the shaft so as to rotate with it is a vessel 7. This vessel is provided with a cover 8, and has interior vanes 9, which ensure the material in it rotating with it. The material to be pumped is fed into a tank not shown and passes thence through the conduit 11, and the channel 12, to the interior of vessel 7. In the vessel, the material receiving a centrifugal motion from the motion of the vessel, is thrown into the open mouth 13 of the tube 14, and through the latter, and the channel 15 and tube 16, to a discharge tank or receptacle not shown.

The interior of vessel 7, as also of the various conduits may be lined with asphaltum or other means to protect them from acidity of the contents.

In some cases a stuffing box may be provided upon cover 8 to make a tight joint between said cover and the conduit block as seen at 18 in the figure, also the two channels 12 and 15 may be concentric, one within the other, as also seen in the figure. 19 is a chamber, having a cover 20, enclosing the stuffing box 18. The case when the feed and discharge channels are concentric is best adapted for use when the vessel 7 is at the top of the shaft, as shown. In this case the inner channel 15 is supported in central position within the outer channel 12 by means of a collar 21, secured to the outer channel at the top end thereof.

Having thus described my invention, and an embodiment of it, in the full, clear and exact terms required by law, and knowing that it comprises novel, useful and valuable improvements in the art to which is pertains, I here state that I do not wish to be limited to the precise construction and arrangement of the several parts, as herein set forth, as the same may be variously modified by a skilled mechanic without departing from the spirit of the invention.

What I claim and desire to secure by Letters Patent of the United States, is the following, to-wit:—

1. A centrifugal conveyer comprising a rotating vessel, a conduit for feeding material into said vessel, means to discharge said material from said vessel, a stuffing box engaging said conduit for said vessel adapted to form an air tight connection therebetween and a closed chamber for said stuffing box.

2. A centrifugal conveyer comprising a rotating vessel, a conduit for feeding material thereto, and a conduit for discharging said material therefrom, one of said conduits being within the other, a cover for said vessel and a stuffing box upon said cover engaging said feeding conduit.

In testimony, that I claim the foregoing I have hereto set my hand this 11 day of June, 1918, in the presence of two witnesses.

FERDINAND W. KROGH.

Witnesses:
FLORENCE L. WOLFE,
R. C. JOHNSON.